(12) United States Patent
Haga et al.

(10) Patent No.: US 9,030,064 B2
(45) Date of Patent: May 12, 2015

(54) TOTALLY-ENCLOSED FAN-COOLED MOTOR

(75) Inventors: Seiji Haga, Tokyo (JP); Kazuto Minagawa, Tokyo (JP); Tadashi Maeda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 303 days.

(21) Appl. No.: 13/812,417

(22) PCT Filed: Jul. 28, 2010

(86) PCT No.: PCT/JP2010/062711
§ 371 (c)(1),
(2), (4) Date: Jan. 25, 2013

(87) PCT Pub. No.: WO2012/014293
PCT Pub. Date: Feb. 2, 2012

(65) Prior Publication Data
US 2013/0119795 A1    May 16, 2013

(51) Int. Cl.
*H02K 9/00* (2006.01)
*H02K 9/04* (2006.01)
*H02K 9/14* (2006.01)
*H02K 9/18* (2006.01)
*H02K 9/22* (2006.01)
(Continued)

(52) U.S. Cl.
CPC .. *H02K 9/04* (2013.01); *H02K 1/20* (2013.01);
*H02K 5/20* (2013.01); *H02K 9/08* (2013.01);
*H02K 9/14* (2013.01); *H02K 9/18* (2013.01);
*H02K 9/22* (2013.01)

(58) Field of Classification Search
USPC .............. 310/59, 60 R, 62–63, 64, 82–83
See application file for complete search history.

(56) References Cited

U.S. PATENT DOCUMENTS 3,610,975 A  *  10/1971  Onjanow ..................... 310/57
3,643,119 A  *   2/1972  Lukens ..................... 310/60 R
(Continued)

FOREIGN PATENT DOCUMENTS

EP        1768234 A1    3/2007
JP        43-5218 Y1    3/1968
(Continued)

OTHER PUBLICATIONS

European Supplementary Search Report dated Sep. 26, 2013 issued in the corresponding European Patent Application No. 10855303.3.
(Continued)

*Primary Examiner* — Thanh Lam
(74) *Attorney, Agent, or Firm* — Buchanan Ingersoll & Rooney PC (57) ABSTRACT

The totally-enclosed fan-cooled motor includes the stator; the rotor; the drive side bracket; the counter drive side bracket; a pair of the bearings; the external fan that sends cooling air to the stator; the internal fan; the heat radiator that is arranged on an outer side of the drive side bracket and is mounted on the rotation shaft; the cover that contains a joint, which connects the rotation shaft extending to an outer side of the drive side bracket of the motor and a reduction gear, and is provided in parallel with the joint; and the ventilation path that is arranged between the drive side bracket and an end of the cover, and includes the outlet causes the cooling air induced by rotation of the heat radiator to flow to the heat radiator and discharges the cooling air outside the motor.

10 Claims, 7 Drawing Sheets

(51) Int. Cl.
  *H02K 1/20* (2006.01)
  *H02K 5/20* (2006.01)
  *H02K 9/08* (2006.01)

(56) References Cited

U.S. PATENT DOCUMENTS

| | | | |
|---|---|---|---|
| 4,353,002 A | 10/1982 | Kobayashi et al. | |
| 4,742,257 A * | 5/1988 | Carpenter | 310/62 |
| 5,081,384 A * | 1/1992 | Rausch | 310/63 |
| 5,114,317 A * | 5/1992 | Cohen | 417/354 |
| 5,751,079 A * | 5/1998 | Bagherpour et al. | 310/59 |
| 5,789,833 A * | 8/1998 | Kinoshita et al. | 310/64 |
| 2004/0150270 A1 | 8/2004 | Nagayama et al. | |
| 2008/0036314 A1 | 2/2008 | Kanei et al. | |

FOREIGN PATENT DOCUMENTS

| | | |
|---|---|---|
| JP | 51-152606 | 12/1976 |
| JP | 54-24609 | 2/1979 |
| JP | 58-112440 A | 7/1983 |
| JP | 09-046971 A | 2/1997 |
| JP | 09-154254 A | 6/1997 |
| JP | 11-285196 A | 10/1999 |
| JP | 2001-103704 A | 4/2001 |
| JP | 2003-143809 A | 5/2003 |
| JP | 2007-300729 A | 11/2007 |
| JP | 2007-318919 A | 12/2007 |
| JP | 2010-100198 A | 5/2010 |
| WO | WO 2005/124971 A1 | 12/2005 |
| WO | WO 2005/124972 A1 | 12/2005 |

OTHER PUBLICATIONS

International Search Report (PCT/ISA/210) issued on Oct. 26, 2010, by the Japanese Patent Office as the International Searching Authority for International Application No. PCT/JP2010/062711.

Written Opinion (PCT/ISA/237) issued on Oct. 26, 2010, by the Japanese Patent Office as the International Searching Authority for International Application No. PCT/JP2010/062711.

* cited by examiner

TOTALLY-ENCLOSED FAN-COOLED MOTOR

FIELD

The present invention relates to a totally-enclosed fan-cooled motor that cools a stator in a sealed motor by an external fan arranged outside the motor and cools a rotor by an internal fan arranged in the motor.

BACKGROUND

In conventional totally-enclosed fan-cooled motors, a stator is cooled by causing cooling air to pass through a first ventilation path formed in the stator by an external fan arranged on the counter drive side, and circulates air through a second ventilation path formed in a rotor core and a third ventilation path formed in a stator core in the sealed motor by an internal fan. Consequently, the air in the motor exchanges heat with the air passing through the first ventilation path while passing through the third ventilation path and is cooled. Furthermore, a bearing is cooled by a heat radiator arranged on the drive side (for example, Patent Literature 1).

CITATION LIST

Patent Literature

Patent Literature 1: International Publication Pamphlet No. WO2005/124971 (FIG. 1 to FIG. 13)

SUMMARY

Technical Problem

However, in a main motor for a cold region, in order to protect a joint that connects the main motor and a gear from freeze damage, the joint needs to be covered with a sealed snow protection cover. If a portion around a drive side bearing, the joint, and the gear of the conventional totally-enclosed fan-cooled motor is covered with the sealed cover, cold air is not supplied to a heat radiator arranged on the drive side bearing, therefore, there is a problem in that the temperature of the drive side bearing becomes high and a bearing grease degrades.

The present invention is achieved in view of the above and has an object to obtain a totally-enclosed fan-cooled motor capable of improving a cooling effect of a bearing arranged on the drive side even when a joint is covered with a sealed snow protection cover.

Solution to Problem

There is provided a totally-enclosed fan-cooled motor according to an aspect of the present invention including: a stator arranged in a frame; a rotor that is attached to a rotation shaft and is arranged to face the stator; a drive side bracket that is arranged at one end of the frame and supports the rotation shaft; a counter drive side bracket that is arranged at another end of the frame and supports the rotation shaft; a pair of bearings that support a drive side and a counter drive side of the rotation shaft; an external fan that is arranged on an outer side of the counter drive side bracket, is mounted on the rotation shaft, and sends cooling air from an outside to the stator; an internal fan that is arranged in the frame and sends air in the motor to the rotor and the stator by circulating the air; a disk-shaped heat radiator that is arranged on an outer side of the drive side bracket and is mounted on the rotation shaft; a cover that has a cylindrical shape, contains a joint, which connects the rotation shaft extending to an outer side of the drive side bracket of the motor and a reduction gear, and is provided in parallel with the joint; and a ventilation path that is arranged between the drive side bracket and an end of the cover, takes in outside cooling air, and includes an outlet that causes the cooling air induced to a portion on an extension in a circumferential direction by rotation of the heat radiator to flow to the heat radiator and discharges the cooling air outside the motor.

Advantageous Effects of Invention

According to this invention, the ventilation path, which takes in cooling air from the external fan outlet on the counter drive side and sends the cooling air directly to the space around the bearing on the drive side, the ventilation path, which passes along the surface of the drive side bracket and introduces cooling air to the heat radiator, and the outlet, which discharges cooling air from the gap between the sealed snow protection cover and the drive side bracket via the heat radiator, are provided, therefore, there is an effect that even if the sealed snow protection cover is attached to the drive side of the motor, the cooling effect of the bearing arranged on the drive side can be improved.

DESCRIPTION OF EMBODIMENTS

Embodiments of a totally-enclosed fan-cooled motor according to the present invention will be explained below in detail with reference to the drawings. This invention is not limited to the embodiments.

First Embodiment

Figure 1:
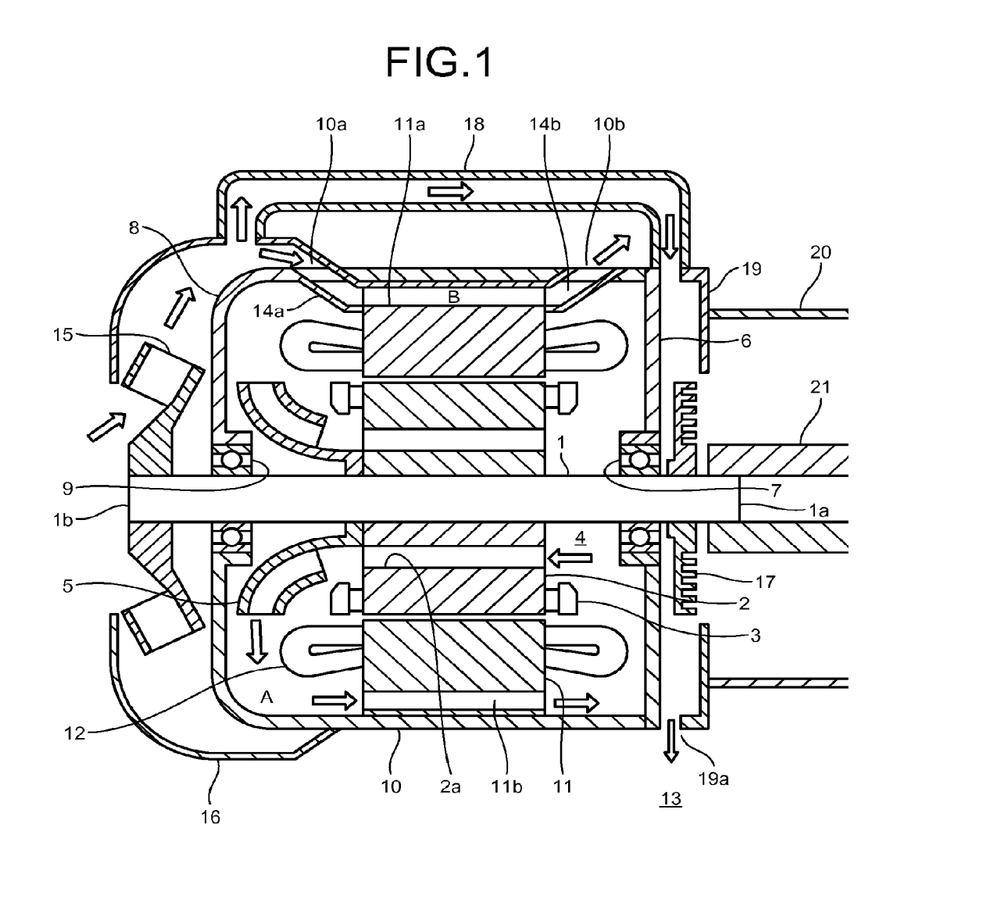
FIG. 1 is a cross-sectional view of a totally-enclosed fan-cooled motor according to a first embodiment of the present invention.

FIG. 1 is a cross-sectional view of a totally-enclosed fan-cooled motor according to the first embodiment of the present invention. In FIG. 1, for example, in the case of being used for a railroad vehicle, a drive side 1a of a rotation shaft 1 is connected to an axle (not shown) of a railway car via a joint 21 (partially shown) and a reduction gear (not shown) and causes the railway car to travel by driving wheels (not shown) attached to the axle.

In a rotor core 2 integrated with the rotation shaft 1, a plurality of ventilation paths 2a extending through in the axis direction of the rotation shaft 1 is formed in the circumferential direction. Moreover, a rotor conductor 3 is arranged on the outer periphery of the rotor core 2.

A rotor 4 is composed of the rotor core 2 and the rotor conductor 3. An internal fan 5 is arranged on a counter drive side 1b of the rotation shaft 1 to suck air in each ventilation path 2a and is integrated with the rotation shaft 1. The internal fan 5 is arranged on the counter drive side 1b in FIG. 1, however, it is not limited to this and the internal fan 5 can be arranged on the drive side 1a.

The drive side 1a of the rotation shaft 1 is rotatably supported by a bearing 7 arranged on a drive side bracket 6. Moreover, the counter drive side 1b of the rotation shaft 1 is rotatably supported by a bearing 9 arranged on a counter drive side bracket 8. The totally-enclosed fan-cooled motor according to the present embodiment connects the drive side bracket 6 and the counter drive side bracket 8 with a frame 10 and is sealed to block the airflow between the inside and the outside of the motor in which the rotor 4 is stored.

On the inner side of the frame 10 of the motor, a stator core 11 is arranged to face the rotor core 2 and stator windings 12 are arranged in this stator core 11. Furthermore, in the stator core 11, a plurality of ventilation paths 11a and 11b is arranged in the axis direction of the rotation shaft 1. The ventilation paths 11a and the ventilation paths 11b are arranged alternately in the circumferential direction of the stator core 11. The ventilation path 11a communicates with outside air holes 10a and 10b arranged in the frame 10 via conduits 14a and 14b. A stator 13 is composed of the stator core 11 and the stator windings 12.

An external fan 15 arranged on the counter drive side 1b of the rotation shaft 1 outside the motor is integrated with the rotation shaft 1 and takes in cooling air from the outside. A fan cover 16 is formed to induce airflow generated by the rotation of the external fan 15 to the ventilation paths 11a via the conduits 14a and 14b.

Then, on the outer side of the bearing 7, which supports the drive side 1a of the rotation shaft 1, of the motor, a heat radiator 17 integrated with the rotation shaft 1 is arranged near the bearing 7.

In the heat radiator 17 shown in FIG. 1, a plurality of grooves is formed as an example, however, the heat radiator 17 may have a disk shape without having such grooves. In this case, although the heat radiation effect is slightly reduced, the manufacturing cost of the heat radiator 17 can be reduced.

Moreover, in the heat radiator 17 shown in FIG. 1, a plurality of grooves is formed in the surface on the drive side 1a of the heat radiator 17, however, it is not limited to this and it is sufficient that the grooves are formed in at least one of the surface on the drive side 1a and the surface on the counter drive side 1b.

Moreover, the shape of the grooves shown in FIG. 1 is one example and may be a shape other than the grooves concentric with the rotation shaft 1 as long as the heat radiation area can be increased.

Next, an explanation is given of a ventilation path 18 (first ventilation path) and a ventilation path 19 (second ventilation path), which are characteristic parts of the totally-enclosed fan-cooled motor according to the present embodiment.

On the outer side of the frame 10, the ventilation path 18, which connects the space outside the motor (the ventilation path 19) on the drive side bracket 6 and the fan cover 16, is provided. This ventilation path 18 is provided at a position at which the ventilation path 18 is avoided from coming into contact with the frame 10 as much as possible.

On the outer side of the drive side bracket 6 of the motor, the ventilation path 19 is provided, and, on the outer side of the ventilation path 19 (the drive side 1a), a snow protection cover 20 (partially shown) is provided.

The ventilation path 19 has a short cylindrical shape vertically arranged toward the snow protection cover 20 from the drive side bracket 6 and an outlet 19a is provided in part of the side surface of the ventilation path 19. Although one outlet 19a is provided in the ventilation path 19 shown in FIG. 1, a plurality of outlets 19a may be formed. With this configuration, the heat radiator 17 can be cooled more effectively.

Next, an explanation is given of a flow of cooling air inside and outside the totally-enclosed fan-cooled motor according to the present embodiment.

In the totally-enclosed fan-cooled motor shown in FIG. 1, the air inside the motor sealed by the drive side bracket 6, the counter drive side bracket 8, and the frame 10 circulates through the path (the ventilation path 11b and the ventilation path 2a in sequence) indicated by an arrow A by the internal fan 5.

Part of the cooling air taken in the fan cover 16 by the external fan 15 flows through the path (the outside air hole 10a, the ventilation path 11a, and the outside air hole 10b in sequence) indicated by an arrow B. As described above, the ventilation paths 11a and the ventilation paths 11b are arranged alternately in the circumferential direction of the stator core 11, therefore, heat exchange is performed between high-temperature air flowing through the ventilation path 11b inside the motor and cooling air flowing through the path B. Accordingly, heat of the stator 13 is effectively radiated outside the motor.

Moreover, part of the cooling air taken in the fan cover 16 by the external fan 15 is diverted to the ventilation path 18 before being heated by heat generation of the stator 13 and the rotor 4, is introduced into the ventilation path 19 while maintaining the low-temperature state, passes the heat radiator 17, and is discharged from the outlet 19a. In other words, part of the cooling air generated by the rotation of the external fan 15 flows through the path of the ventilation path 18, the ventilation path 19, the heat radiator 17, and the outlet 19a.

On the counter drive side 1b of the rotation shaft 1, heat generated in the rotor 4 is transferred to the rotation shaft 1 and is radiated via the external fan 15. Moreover, on the drive side 1a of the rotation shaft 1, heat generated in the rotor 4 is transferred to the rotation shaft 1 and is radiated via the heat radiator 17. The heat radiated from the heat radiator 17 is discharged from the outlet 19a together with the cooling air from the ventilation path 18.

As explained above, the totally-enclosed fan-cooled motor according to the present embodiment includes the stator 13 arranged in the frame 10; the rotor 4 that is attached to the rotation shaft 1 and is arranged to face the stator 13; the drive side bracket 6 that is arranged at one end of the frame 10 and supports the rotation shaft 1; the counter drive side bracket 8 that is arranged at the other end of the frame 10 and supports the rotation shaft 1; a pair of the bearings 7 and 9 that support the drive side 1a and the counter drive side 1b of the rotation shaft 1; the external fan 15 that is arranged on the outer side of the counter drive side bracket 8, is mounted on the rotation shaft 1, and sends cooling air from the outside to the stator 13; the internal fan 5 that is arranged in the frame 10 and sends air in the motor to the rotor 4 and the stator 13 by circulating the air; the disk-shaped heat radiator 17 that is arranged on the outer side of the drive side bracket 6 and is mounted on the rotation shaft 1; the snow protection cover 20 that is mounted on the outer side of the drive side bracket 6; the ventilation path 18 (first ventilation path) that induces part of the cooling air taken in from the external fan 15 to the drive side bracket 6 without contacting the frame 10; and the ventilation path 19 (second ventilation path) that is arranged between the drive side bracket 6 and the snow protection cover 20, and includes the outlet 19a that communicates with the ventilation path 18, causes the cooling air passed through the ventilation path 18 to pass through the heat radiator 17, and discharges the cooling air outside the motor. Therefore, even when the sealed snow protection cover 20 is provided on the drive side 1a of the rotation shaft 1, the cooling effect of the bearing 7 that supports the drive side 1a can be improved via the heat radiator 17.

Moreover, in the heat radiator 17 according to the present embodiment, grooves concentric with the rotation shaft 1 are formed in at least one of the surface on the drive side 1a and the surface on the counter drive side 1b, therefore, heat generated in the rotor 4 can be effectively radiated outside the motor. Consequently, the cooling effect of the bearing 7 can be further improved.

Second Embodiment

Figure 2:
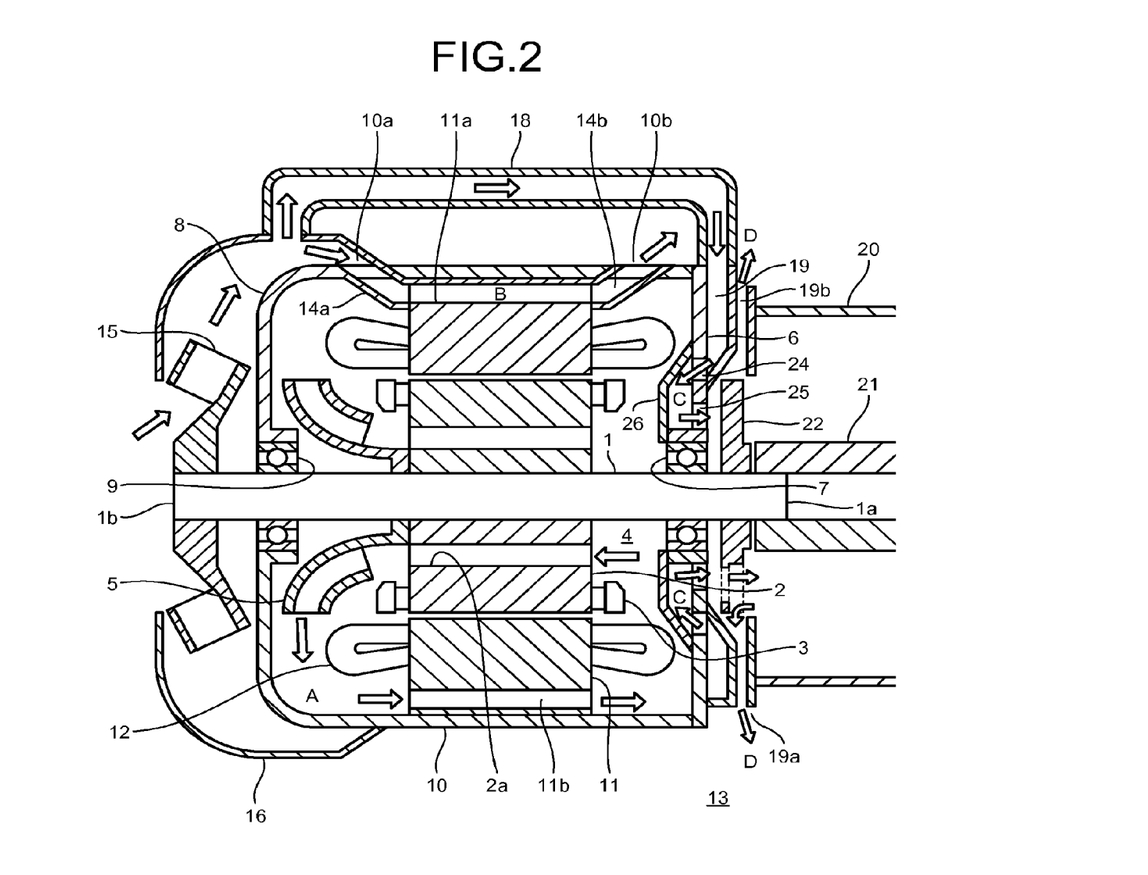
FIG. 2 is a cross-sectional view of a totally-enclosed fan-cooled motor according to a second embodiment of the present invention.
Figure 3:
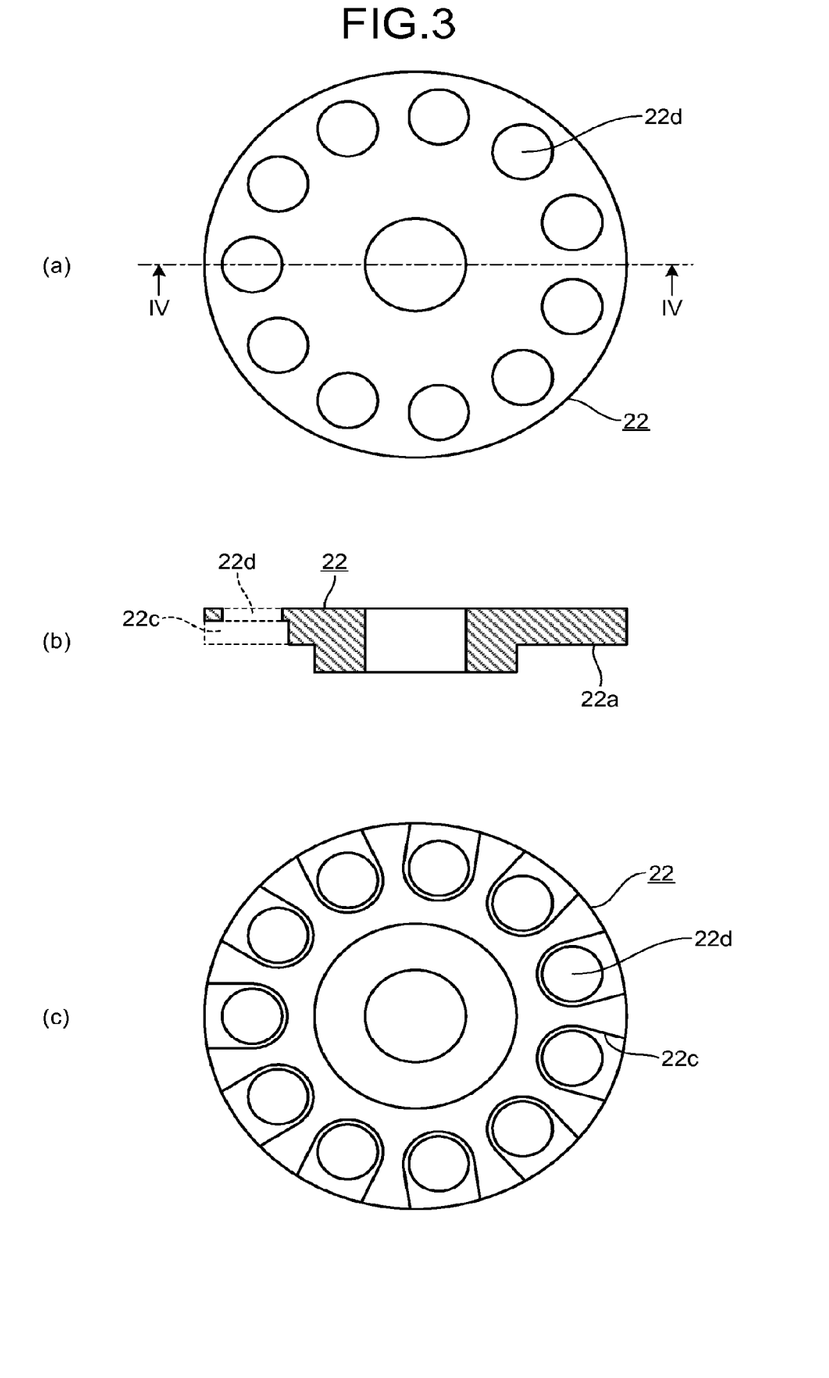
FIG. 3 is a diagram illustrating the structure of a heat radiator shown in FIG. 2.

FIG. 2 is a cross-sectional view of a totally-enclosed fan-cooled motor according to the second embodiment of the present invention and FIG. 3 is a diagram illustrating the structure of a heat radiator 22 shown in FIG. 2. FIG. 3(a) is a front view illustrating a main portion in FIG. 2, FIG. 3(b) is a cross-sectional view taken along line IV-IV in FIG. 3(a), and FIG. 3(c) is a back view. In the following, the same parts as those in the first embodiment are denoted by the same reference numerals and explanation thereof is omitted, and only different parts will be described here.

In FIG. 2, on the outer side of the bearing 7, which supports the drive side 1a of the rotation shaft 1, of the motor, the heat radiator 22 integrated with the rotation shaft 1 is provided near the bearing 7.

The ventilation paths 19 and 19b (second ventilation path) are arranged between the drive side bracket 6 and the snow protection cover 20, and include the outlets 19a that communicate with the ventilation path 18 (first ventilation path), cause the cooling air passed through the ventilation path 18 to flow to the heat radiator 22, and discharge the cooling air outside the motor. As shown in FIG. 2, the ventilation paths 19 and 19b are formed between the snow protection cover 20 and the bracket 6 and form a double structure with which cooling air from the ventilation path 18 is discharged from a portion between the ventilation path 18 and the snow protection cover 20 after inducing it near the heat radiator 22 (including a heat radiator 23 to be described later).

With respect to the ventilation paths 19 and 19b shown in FIG. 2, two outlets 19a are illustrated, however, it is not limited to this. For example, three or more outlets 19a may be provided. With this configuration, the heat radiator 22 can be cooled more effectively.

In the drive side bracket 6, air holes 24 (first air hole), which is formed at positions to surround the outer periphery of the bearing 7 and communicate with the ventilation path 19, and air holes 25 (second air hole) formed between the air holes 24 and the bearing 7 are formed.

Furthermore, a cover (shield plate) 26 is arranged on the drive side bracket 6, which is arranged to be able to seal the inside of the motor on the inner side of the drive side bracket 6, surrounds the outer peripheral surface of the bearing 7 on the drive side, and causes the air hole 24 and the air hole 25 to communicate with each other. This cover 26 is formed by utilizing the space around the bearing 7 without contacting the stator windings 12 and the rotor core 2 and is arranged such that air circulating through the path indicated by the arrow A does not directly come into contact with the bearing 7. Therefore, the cover 26 can prevent cooling air from entering the inside of the motor from the air holes 24 and the air holes 25 and can cool the bearing 7 by the cooling air from the ventilation path 18.

As shown in FIG. 3, in the heat radiator 22, a disk portion 22a, a plurality of U-shaped cutout portions 22c, and through holes 22d are formed. The disk portion 22a is arranged on the side of the bearing 7 that supports the drive side 1a of the rotation shaft 1. The plurality of U-shaped cutout portions 22c are formed in the surface on the counter drive side 1b, each extend from the rotation shaft 1 to the outer peripheral side of the heat radiator 22, and are open on the outer peripheral side of the heat radiator 22. The through holes 22d penetrate from the surface on the drive side 1a to the surface on the counter drive side 1b.

As shown in FIG. 3, the through holes 22d are formed near the roots (that is, on the central side of the heat radiator 22) of the cutout portions 22c, therefore, the contact area between the cooling air passed through the through holes 22d and the cutout portions 22c increases compared with the case where the through holes 22d are formed on the outer peripheral side of the heat radiator 22. Thus, the cooling effect of the heat radiator 22 can be improved.

The through holes 22d shown in FIG. 3 are formed near the roots of the cutout portions 22c, that is, in the bottom portion of the cutout portions 22c, however, it is not limited to this and the through holes 22d may be formed in a portion closer to the outer periphery of the heat radiator 22 than the roots of the cutout portions 22c. In this case, although the rate of the cooling air, which has passed through the through holes 22d and comes into contact with the cutout portions 22c, decreases, the cooling effect of the heat radiator 22 can be improved compared with the case with no through hole 22d. Moreover, although the through holes 22d shown in FIG. 3 are formed in all the cutout portions 22c, for example, one through hole 22d may be formed per two or three cutout portions 22c. In this case, although the cooling effect of the heat radiator 22 slightly decreases compared with the case where the through holes 22d are formed in all the cutout portions 22c, the processing cost of the heat radiator 22 can be reduced.

The totally-enclosed fan-cooled motor is configured to discharge cooling air around the heat radiator 22 from the outlets 19a by a centrifugal force by rotating the heat radiator 22. More specifically, the heat radiator 22 supplies the cooling air passed through the air holes 24 and 25 to be described later to the inside of the snow protection cover 20 through the through holes 22d. The cooling air supplied to the inside of the snow protection cover 20 is cooled via the snow protection cover 20 and is thereafter discharged from the outlets 19a through the cutout portions 22c by a centrifugal force generated by the rotation of the heat radiator 22. Consequently, the heat radiator 22 is cooled by the cooling air supplied from the air holes 25 and the air from the snow protection cover 20.

The cooling air flowing in the ventilation path 18 and the ventilation path 19 is supplied to the heat radiator 22 by a positive pressure generated by the rotation of the external fan 15 and a negative pressure generated by the rotation of the heat radiator 22. Accordingly, for example, the flow rate increases compared with the case of the rotation of only any one of the external fan 15 and the heat radiator 22 and therefore the heat radiator 22 can be effectively cooled.

Next, an explanation is given of a flow of the cooling air passing through the ventilation path 18, the ventilation path 19, and the ventilation paths 19b.

Part of the cooling air taken in the fan cover 16 by the external fan 15 is diverted to the ventilation path 18 before being heated by heat generation of the stator 13 and the rotor 4 and is introduced into the ventilation path 19 while maintaining the low-temperature state. The cooling air introduced into the ventilation path 19 passes through the air holes 24 and 25 provided in the drive side bracket 6 and is supplied to the heat radiator 22. In other words, part of the cooling air generated by the rotation of the external fan 15 is supplied to the heat radiator 22 through the path (the ventilation path 18, the ventilation path 19, the air holes 24, the cover 26, and the air holes 25 in sequence) indicated by an arrow C.

As described above, the cooling air supplied to the heat radiator 22 passes through the through holes 22d formed in the heat radiator 22, once enters the inside of the snow protection cover 20, and cools the air and the joint 21 in the snow protection cover 20. Furthermore, the air inside the snow protection cover 20 is induced to the ventilation paths 19b by a centrifugal force of the heat radiator 22 and is discharged from the outlets 19a. In other words, the cooling air supplied to the heat radiator 22 is discharged outside the motor through the path (the heat radiator 22, the snow protection cover 20, the ventilation paths 19b, and the outlets 19a in sequence) indicated by an arrow D. Accordingly, the heat transferred to the heat radiator 22 from the rotor 4 via the rotation shaft 1 is radiated via the heat radiator 22 and the heat radiated from the heat radiator 22 is discharged from the outlets 19a.

As above, the totally-enclosed fan-cooled motor according to the present embodiment includes the stator 13, the rotor 4, the drive side bracket 6, the counter drive side bracket 8, the bearings 7 and 9, the external fan 15, the internal fan 5, the disk-shaped heat radiator 22 that is arranged on the outer side of the drive side bracket 6 and is mounted on the rotation shaft 1, the snow protection cover 20, the ventilation path 18 (first ventilation path), and the ventilation paths 19 and 19b (second ventilation path). The ventilation paths 19 and 19b are arranged between the drive side bracket 6 and the snow protection cover 20 and include the outlets 19a that communicate with the ventilation path 18, cause the cooling air passed through the ventilation path 18 to pass through the heat radiator 22, and discharge the cooling air outside the motor. In the drive side bracket 6, the air holes 24 (first air hole) which is formed at positions to surround the outer periphery of the bearing 7 and communicate with the ventilation path 19, and the air holes 25 (second air hole) formed between the air holes 24 and the bearing 7 are formed, and the cover (shield plate) 26 is arranged. The cover 26 is arranged to be able to seal the inside of the motor on the inner side of the drive side bracket 6, surrounds the outer peripheral surface of the drive side bearing 7, and causes the air holes 24 and the air holes 25 to communicate with each other. Therefore, the bearing 7 can be indirectly cooled by the heat radiator 22 and moreover the bearing 7 can be cooled directly by the cover 26. Consequently, the cooling effect of the bearing 7 can be improved compared with the totally-enclosed fan-cooled motor according to the first embodiment.

Moreover, the heat radiator 22 according to the present embodiment includes a plurality of U-shaped cutout portions 22c, which are formed in the surface on the drive side 1a thereof, each extend from the rotation shaft 1 to the outer peripheral side of the heat radiator 22, and are open on the outer peripheral side of the heat radiator 22, and the through holes 22d, which penetrate from the surface on the drive side 1a to the surface on the counter drive side 1b, are formed in the cutout portions 22c, therefore, the air in the snow protection cover 20 can be discharged outside the motor through the ventilation paths 19b by rotating the heat radiator 22. Thus, for example, even if heat transferred to the joint 21 from the rotation shaft 1 accumulates in the snow protection cover 20, the air in the snow protection cover 20 can be effectively discharged outside the motor by the heat radiator 22. Consequently, the totally-enclosed fan-cooled motor according to the present embodiment can further improve the cooling effect of the bearing 7 compared with the case where the heat radiator 17 according to the first embodiment is used.

Moreover, the through holes 22d according to the present embodiment are formed in the bottom portion of the cutout portions 22c. Therefore, the heat radiator 22 is effectively cooled compared with the case where the through holes 22d are formed on the outer peripheral side of the heat radiator 22. Thus, the cooling effect of the bearing 7 can be improved.

Because the outlets 19a are formed on the extension in a direction in which the heat radiator 22 extends, the air sucked from the snow protection cover 20 can be effectively discharged outside the motor by a centrifugal force of the heat radiator 22.

Third Embodiment

Figure 4:
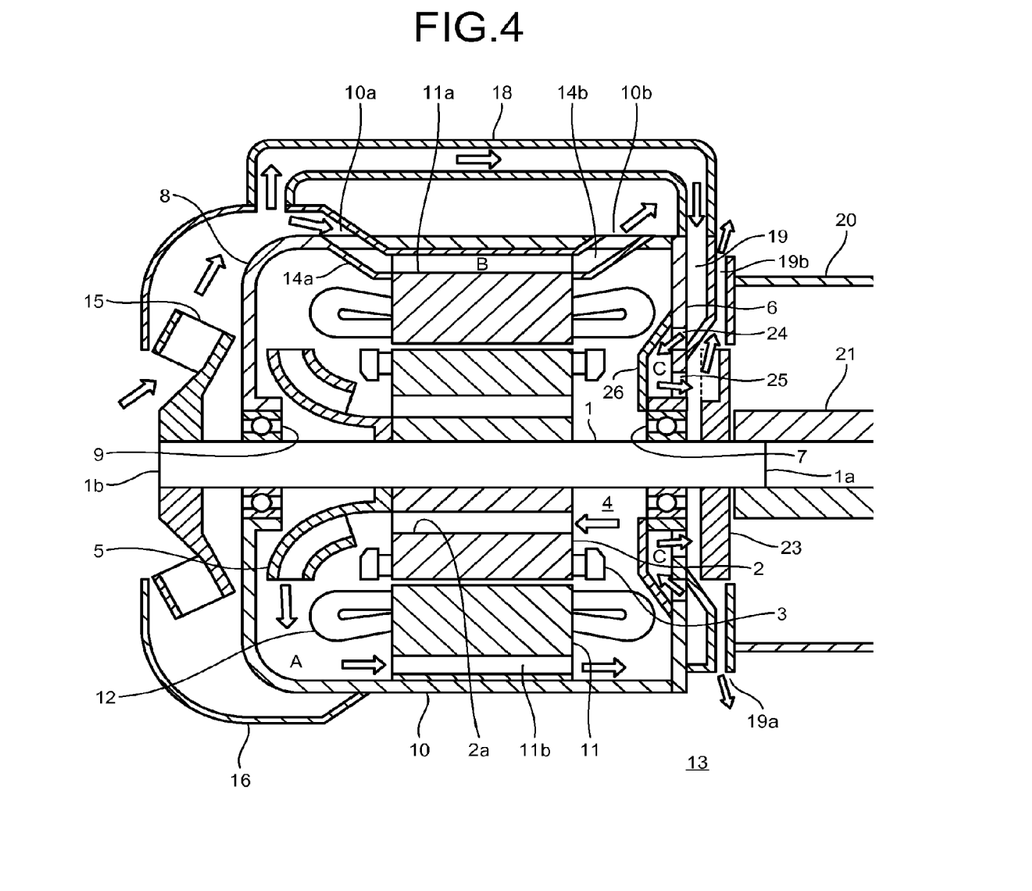
FIG. 4 is a cross-sectional view of a totally-enclosed fan-cooled motor according to a third embodiment of the present invention.
Figure 5:
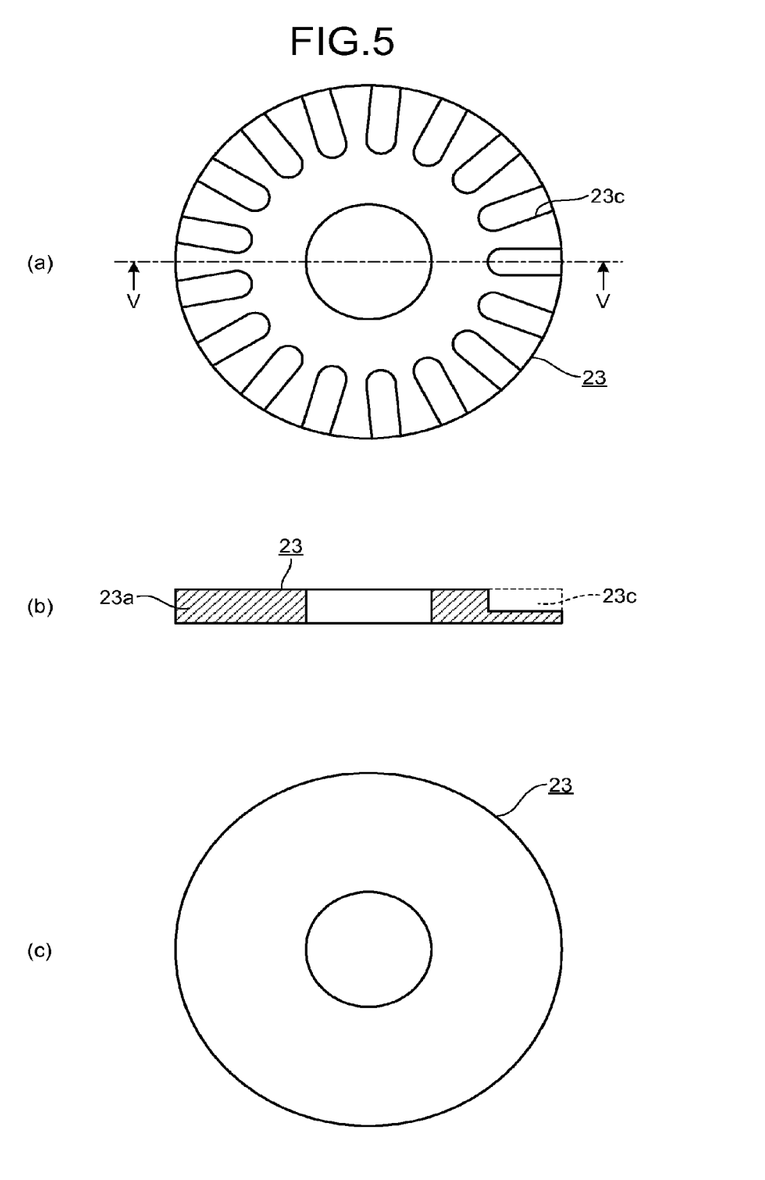
FIG. 5 is a diagram illustrating the structure of a heat radiator shown in FIG. 4.

FIG. 4 is a cross-sectional view of a totally-enclosed fan-cooled motor according to the third embodiment of the present invention and FIG. 5 is a diagram illustrating the structure of the heat radiator 23 shown in FIG. 4. FIG. 5(a) is a front view illustrating a main portion in FIG. 4, FIG. 5(b) is a cross-sectional view taken along line V-V in FIG. 5(a), and FIG. 5(c) is a back view. In the following, the same parts as those in the second embodiment are denoted by the same reference numerals and explanation thereof is omitted, and only different parts will be described here.

In FIG. 4, on the outer side of the bearing 7, which supports the drive side 1a of the rotation shaft 1, of the motor, the heat radiator 23 integrated with the rotation shaft 1 is provided near the bearing 7.

As shown in FIG. 5, in the heat radiator 23, a disk portion 23a and a plurality of U-shaped cutout portions 23c are formed. The disk portion 23a is arranged on the side of the bearing 7 that supports the drive side 1a of the rotation shaft 1. The plurality of U-shaped cutout portions 23c are formed in the surface on the counter drive side 1b, each extend from the rotation shaft 1 to the outer peripheral side of the heat radiator 23, and are open on the outer peripheral side of the heat radiator 23. Because the through holes 22d as shown in FIG. 3 are not formed in the bottom portion of the cutout portions 23c, the shape of the cutout portions 23c may be a shape other than the U-shape, for example, a V-shape.

In the totally-enclosed fan-cooled motor configured in such a manner, cooling air around the heat radiator 23 is discharged from the outlets 19a by a centrifugal force by rotating the heat radiator 23. More specifically, the heat radiator 23 discharges the cooling air passed through the air holes 24 and 25 from the outlets 19a via the cutout portions 23c. At this time, the heat radiator 23 is cooled by the cooling air supplied from the air holes 25. In a similar manner to the second embodiment, the cooling air flowing in the ventilation path 18 and the ventilation path 19 is supplied to the heat radiator 23 by a positive pressure generated by the rotation of the external fan 15 and a negative pressure generated by the rotation of the heat radiator 23. Therefore, the heat radiator 23 can be effectively cooled, for example, compared with the case of the rotation of only any one of the external fan 15 and the heat radiator 23.

Next, an explanation is given of a flow of the cooling air passing through the ventilation path 18, the ventilation path 19, and the ventilation paths 19b.

Part of the cooling air taken in the fan cover 16 by the external fan 15 is diverted to the ventilation path 18 before being heated by heat generation of the stator 13 and the rotor 4 and is introduced into the ventilation path 19 while maintaining the low-temperature state. The cooling air introduced into the ventilation path 19 passes through the air holes 24 and 25 provided in the drive side bracket 6 and is supplied to the heat radiator 23. In other words, part of the cooling air generated by the rotation of the external fan 15 is supplied to the heat radiator 23 through the path (the ventilation path 18, the ventilation path 19, the air holes 24, the cover 26, and the air holes 25 in sequence) indicated by the arrow C.

The cooling air supplied to the heat radiator 23 is induced to the ventilation paths 19b by a centrifugal force of the heat radiator 23 and is discharged from the outlets 19a. Accordingly, the heat transferred to the heat radiator 23 from the rotor 4 via the rotation shaft 1 is radiated via the heat radiator 23 and the heat radiated from the heat radiator 23 is discharged from the outlets 19a.

As above, the totally-enclosed fan-cooled motor according to the present embodiment includes the stator 13, the rotor 4, the drive side bracket 6, the counter drive side bracket 8, the bearings 7 and 9, the external fan 15, the internal fan 5, the disk-shaped heat radiator 23 that is arranged on the outer side of the drive side bracket 6 and is mounted on the rotation shaft 1, the snow protection cover 20, the ventilation path 18 (first ventilation path), and the ventilation paths 19 and 19b (second ventilation path). In the drive side bracket 6, the air holes 24 (first air hole) and the air holes 25 (second air hole) are formed, and the cover (shield plate) 26 is arranged. Therefore, the bearing 7 can be cooled by the heat radiator 23. Consequently, the cooling effect of the bearing 7 can be improved compared with the totally-enclosed fan-cooled motor according to the first embodiment and the manufacturing cost of the heat radiator 23 can be reduced compared with the heat radiator 22 according to the second embodiment.

Moreover, the heat radiator 23 according to the present embodiment includes a plurality of U-shaped cutout portions 23c, which are formed in the surface on the counter drive side 1b thereof, each extend from the rotation shaft 1 to the outer peripheral side of the heat radiator 23, and are open on the outer peripheral side of the heat radiator 23. Therefore, the cooling air passed through the cover 26 can be discharged outside the motor through the ventilation path 19b by rotating the heat radiator 23. Thus, cooling air via the cover 26 can be promptly discharged outside the motor. Consequently, the totally-enclosed fan-cooled motor according to the present embodiment can further improve the cooling effect of the bearing 7 compared with the case where the heat radiator 17 according to the first embodiment is used while preventing outside air (cooling air supplied by the external fan 15) from entering the inside of the snow protection cover 20 and around the joint 21.

Moreover, because the outlets 19a are formed on the extension in a direction in which the heat radiator 23 extends, the cooling air supplied from the air holes 25 to the heat radiator 23 can be effectively discharged outside the motor by a centrifugal force of the heat radiator 23.

Fourth Embodiment

Figure 6:
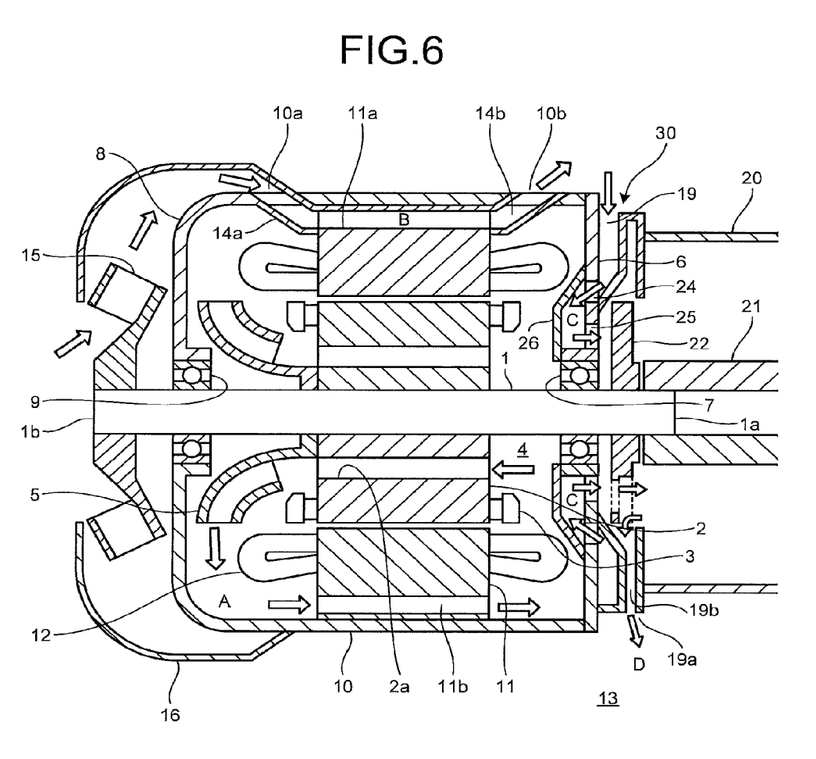
FIG. 6 is a cross-sectional view of a totally-enclosed fan-cooled motor according to a fourth embodiment of the present invention.

FIG. 6 is a cross-sectional view of a totally-enclosed fan-cooled motor according to the fourth embodiment of the present invention. The point different from the totally-enclosed fan-cooled motor according to the second embodiment is that the ventilation path 18 is omitted and an opening 30 is formed in the ventilation path 19. In the following, the same parts as those in the second embodiment are denoted by the same reference numerals and explanation thereof is omitted, and only different parts will be described here.

The ventilation path 19 and the ventilation path 19b are arranged between the drive side bracket 6 and the snow protection cover 20, include the opening 30 that takes in outside air, and include the outlet 19a that causes the cooling air taken in from the opening 30 to flow to the heat radiator 22 and discharges it outside the motor. With respect to the ventilation paths 19 and 19b shown in FIG. 6, one opening 30 and one outlet 19a are illustrated, however, the number of each of the openings 30 and the outlets 19a is not limited to one.

In the drive side bracket 6, the air holes 24 (first air hole), the air holes 25 (second air hole) 25, and the cover 26 (shield plate) are provided.

The totally-enclosed fan-cooled motor configured in such a manner is configured to discharge cooling air around the heat radiator 22 from the outlet 19a by a centrifugal force by rotating the heat radiator 22. More specifically, the heat radiator 22 supplies the cooling air passed through the air holes 24 and 25 to be described later to the inside of the snow protection cover 20 through the through holes 22d (see FIG. 3). The cooling air supplied to the inside of the snow protection cover 20 is cooled via the snow protection cover 20 and is thereafter discharged from the outlet 19a through the cutout portions 22c (see FIG. 3) by a centrifugal force generated by the rotation of the heat radiator 22. Consequently, the heat radiator 22 is cooled by the cooling air supplied from the air hole 25 and the air from the snow protection cover 20.

Next, an explanation is given of a flow of the cooling air taken in from the opening 30.

The cooling air introduced into the ventilation path 19 from the opening 30 passes through the air holes 24 and the air holes 25 provided in the drive side bracket 6 and is supplied to the heat radiator 22. In other words, part of the cooling air is supplied to the heat radiator 22 through the path (the opening 30, the ventilation path 19, the air holes 24, the cover 26, and the air holes 25 in sequence) indicated by the arrow C.

As described above, the cooling air supplied to the heat radiator 22 passes through the through holes 22d formed in the heat radiator 22, once enters the inside of the snow protection cover 20, and cools the air and the joint 21 in the snow protection cover 20. Furthermore, the air inside the snow protection cover 20 is induced to the ventilation path 19b by a centrifugal force of the heat radiator 22 and is discharged from the outlet 19a. In other words, the cooling air supplied to the heat radiator 22 is discharged outside the motor through the path (the heat radiator 22, the snow protection cover 20, the ventilation path 19b, and the outlet 19a in sequence) indicated by the arrow D. Accordingly, the heat transferred to the heat radiator 22 from the rotor 4 via the rotation shaft 1 is radiated via the heat radiator 22 and the heat radiated from the heat radiator 22 is discharged from the outlet 19a.

As above, the totally-enclosed fan-cooled motor according to the present embodiment includes the stator 13, the rotor 4, the drive side bracket 6, the counter drive side bracket 8, the bearings 7 and 9, the external fan 15, the internal fan 5, the disk-shaped heat radiator 22, the snow protection cover 20, and the ventilation paths 19 and 19b. The ventilation paths 19 and 19b are arranged between the drive side bracket 6 and the snow protection cover 20, include the opening 30 that takes in outside air, and include the outlet 19a that causes the cooling air taken in from the opening 30 to flow to the heat radiator 22 and discharges it outside the motor. In the drive side bracket 6, the air holes 24 (first air hole), the air holes 25 (second air hole), and the cover 26 (shield plate) are arranged. Therefore, outside air can be sucked and supplied to the heat radiator 22 by the suction effect generated by the heat radiator 22. In the totally-enclosed fan-cooled motor according to the present embodiment, a positive pressure by the rotation of the external fan 15 does not act on the cooling air supplied to the heat radiator 22, therefore, although the amount of the cooling air supplied to the heat radiator 22 decreases compared with the totally-enclosed fan-cooled motor according to the second embodiment, the bearing 7 can be indirectly cooled by the heat radiator 22. Furthermore, the bearing 7 can be cooled directly by the cover 26. Consequently, the cooling effect of the bearing 7 can be improved compared with the totally-enclosed fan-cooled motor according to the first embodiment and the manufacturing cost can be reduced compared with the totally-enclosed fan-cooled motor according to the second embodiment.

Fifth Embodiment

Figure 7:
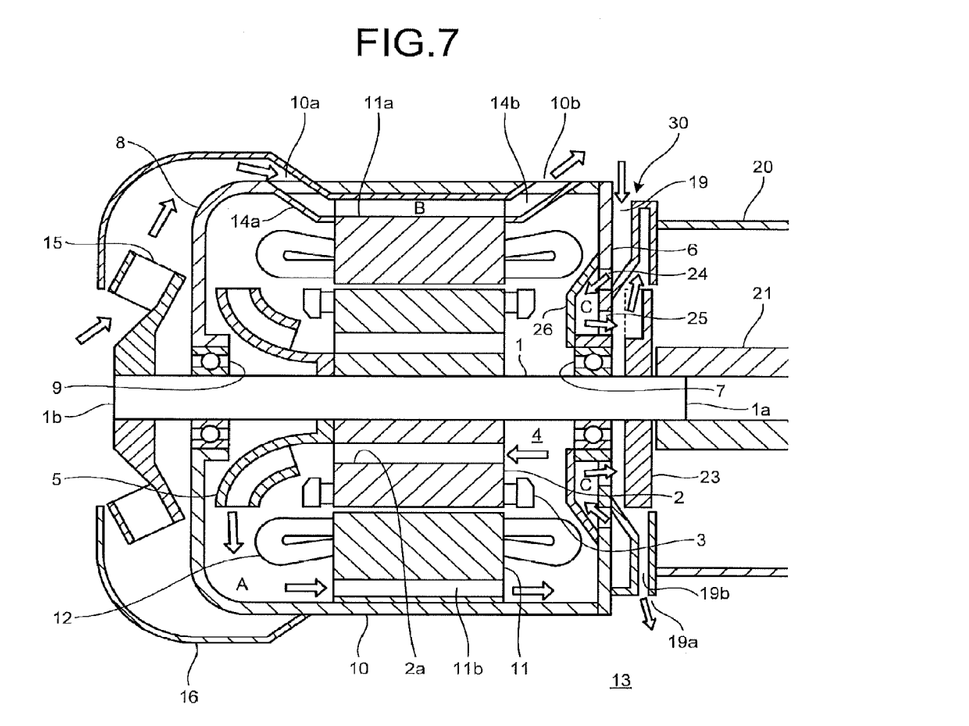
FIG. 7 is a cross-sectional view of a totally-enclosed fan-cooled motor according to a fifth embodiment of the present invention.

FIG. 7 is a cross-sectional view of a totally-enclosed fan-cooled motor according to the fifth embodiment of the present invention. The point different from the totally-enclosed fan-cooled motor according to the third embodiment is that the ventilation path 18 is omitted and the opening 30 is formed in the ventilation path 19. In the following, the same parts as those in the third embodiment are denoted by the same reference numerals and explanation thereof is omitted, and only different parts will be described here.

The ventilation paths 19 and 19b are arranged between the drive side bracket 6 and the snow protection cover 20, include the opening 30 that takes in outside air, and include the outlet 19a that causes the cooling air taken in from the opening 30 to flow to the heat radiator 23 and discharges it outside the motor. With respect to the ventilation paths 19 and 19b shown in FIG. 7, one opening 30 and one outlet 19a are illustrated, however, the number of each of the openings 30 and the outlets 19a is not limited to one.

In the drive side bracket 6, the air holes 24 (first air hole), the air holes 25 (second air hole) 25, and the cover 26 (shield plate) are provided.

In the totally-enclosed fan-cooled motor configured in such a manner, cooling air around the heat radiator 23 is discharged from the outlet 19a by a centrifugal force by rotating the heat radiator 23. More specifically, the heat radiator 23 discharges the cooling air passed through the air holes 24 and 25 from the outlet 19a via the cutout portions 23c (see FIG. 5). At this time, the heat radiator 23 is cooled by the cooling air taken in from the opening 30.

Next, an explanation is given of a flow of the cooling air taken in from the opening 30.

The cooling air introduced into the ventilation path 19 from the opening 30 passes through the air holes 24 and 25 provided in the drive side bracket 6 and is supplied to the heat radiator 23. In other words, part of the cooling air is supplied to the heat radiator 23 through the path (the opening 30, the ventilation path 19, the air holes 24, the cover 26, and the air holes 25 in sequence) indicated by the arrow C.

The cooling air supplied to the heat radiator 23 is induced to the ventilation path 19b by a centrifugal force of the heat radiator 23 and is discharged from the outlet 19a. Accordingly, the heat transferred to the heat radiator 23 from the rotor 4 via the rotation shaft 1 is radiated via the heat radiator 23 and the heat radiated from the heat radiator 23 is discharged from the outlet 19a.

As above, the totally-enclosed fan-cooled motor according to the present embodiment includes the stator 13, the rotor 4, the drive side bracket 6, the counter drive side bracket 8, the bearings 7 and 9, the external fan 15, the internal fan 5, the disk-shaped heat radiator 23, the snow protection cover 20, and the ventilation paths 19 and 19b. The ventilation paths 19 and 19b are arranged between the drive side bracket 6 and the snow protection cover 20, include the opening 30 that takes in outside air, and include the outlet 19a that causes the cooling air taken in from the opening 30 to flow to the heat radiator 23 and discharges it outside the motor. In the drive side bracket 6, the air holes 24 (first air hole), the air holes 25 (second air hole), and the cover 26 (shield plate) are arranged. Therefore, outside air can be sucked and supplied to the heat radiator 23 by the suction effect generated by the heat radiator 23. In the totally-enclosed fan-cooled motor according to the present embodiment, a positive pressure by the rotation of the external fan 15 does not act on the cooling air supplied to the heat radiator 23, therefore, although the amount of the cooling air supplied to the heat radiator 23 decreases compared with the totally-enclosed fan-cooled motor according to the third embodiment, the bearing 7 can be indirectly cooled by the heat radiator 23. Furthermore, the bearing 7 can be directly cooled by the cover 26. Consequently, the cooling effect of the bearing 7 can be improved compared with the totally-enclosed fan-cooled motor according to the first embodiment and the manufacturing cost can be reduced compared with the totally-enclosed fan-cooled motor according to the third embodiment.

In the second to fifth embodiments, explanation is given of the configuration in which the cover (shield plate) 26 is arranged on the inner side of the bracket 6, however, for example, the bracket 6 itself may be formed into a recess shape that surrounds the outer peripheral surface of the bearing 7 and communicates with the ventilation path 19. In this case also, the bearing 7 can be directly cooled and moreover, the cost associated with attachment of the cover 26 and processing of the air holes 24 and 25 can be reduced.

It is explained that the snow protection cover 20 illustrated in the first to fifth embodiments is a sealed type, however, it is not limited to this and the snow protection cover 20 may include an opening in part thereof as long as it can prevent snow from entering.

The totally-enclosed fan-cooled motors illustrated in the first to fifth embodiments are an example of the content of the present invention and it goes without saying that they can be combined with other publicly known technologies and can be changed by, for example, omitting a part thereof without departing from the gist of the present invention.

INDUSTRIAL APPLICABILITY

As above, the present invention can be applied to a totally-enclosed fan-cooled motor and is particularly useful as an invention capable of improving the cooling effect of a bearing arranged on the drive side even when a joint is covered with a sealed snow protection cover.

REFERENCE SIGNS LIST 1 rotation shaft
1a drive side
1b counter drive side
2 rotor core
2a, 11a, 11b ventilation path
3 rotor conductor
4 rotor
5 internal fan
6 drive side bracket
7, 9 bearing
8 counter drive side bracket 10 frame
10a, 10b outside air hole
11 stator core
12 stator winding
13 stator
14a, 14b conduit
15 external fan
16 fan cover
17, 22, 23 heat radiator
18 ventilation path (first ventilation path)
19, 19b ventilation path (second ventilation path)
19a outlet
20 snow protection cover (cover)
21 joint
22a, 23a disk portion
22d through hole
22c, 23c cutout portion
24 air hole (first air hole)
25 air hole (second air hole)
26 cover (shield plate)
30 opening

The invention claimed is:

1. A totally-enclosed fan-cooled motor comprising:
a stator arranged in a frame;
a rotor that is attached to a rotation shaft and is arranged to face the stator;
a drive side bracket that is arranged at one end of the frame and supports the rotation shaft;
a counter drive side bracket that is arranged at another end of the frame and supports the rotation shaft;
a pair of bearings that support a drive side and a counter drive side of the rotation shaft;
an external fan that is arranged on an outer side of the counter drive side bracket, is mounted on the rotation shaft, and sends cooling air from an outside to the stator;
an internal fan that is arranged in the frame and sends air in the motor to the rotor and the stator by circulating the air;
a disk-shaped heat radiator that is arranged on an outer side of the drive side bracket and is mounted on the rotation shaft;
a cover that has a cylindrical shape, contains a joint, which connects the rotation shaft extending to an outer side of the drive side bracket of the motor and a reduction gear, and is provided in parallel with the joint; and
a ventilation path that is arranged between the drive side bracket and an end of the cover, takes in outside cooling air, and includes an outlet that causes the cooling air induced to a portion on an extension in a circumferential direction by rotation of the heat radiator to flow to the heat radiator and discharges the cooling air outside the motor.

2. The totally-enclosed fan-cooled motor according to claim 1, further comprising a ventilation path that induces part of the cooling air taken in from the external fan to the drive side bracket without contacting the frame, wherein
the ventilation path including the outlet communicates with the ventilation path, which induces the cooling air to the drive side bracket, and causes the cooling air passed the ventilation path inducing the cooling air to the drive side bracket to flow to the heat radiator.

3. The totally-enclosed fan-cooled motor according to claim 1, wherein, in the drive side bracket, a first air hole, which is formed at a position to surround an outer periphery of the bearing and communicates with the ventilation path including the outlet, and a second air hole formed between the first air hole and the bearing are formed, and a shield plate, which is arranged to be able to seal an inside of the motor on an inner side of the drive side bracket, surrounds an outer peripheral surface of a drive side bearing, and causes the first air hole and the second air hole to communicate with each other, is arranged.

4. The totally-enclosed fan-cooled motor according to claim 2, wherein, in the drive side bracket, a first air hole, which is formed at a position to surround an outer periphery of the bearing and communicates with the ventilation path including the outlet, and a second air hole formed between the first air hole and the bearing are formed, and a shield plate, which is arranged to be able to seal an inside of the motor on an inner side of the drive side bracket, surrounds an outer peripheral surface of a drive side bearing, and causes the first air hole and the second air hole to communicate with each other, is arranged.

5. The totally-enclosed fan-cooled motor according to claim 1, wherein the end portion of the cover is arranged in a state of being in contact with the ventilation path including the outlet.

6. The totally-enclosed fan-cooled motor according to claim 1, wherein, in the heat radiator, a groove concentric with the rotation shaft is formed in at least one of a surface on the drive side and a surface on the counter drive side.

7. The totally-enclosed fan-cooled motor according to claim 1, wherein the heat radiator includes a plurality of U-shaped cutout portions, which are formed in a surface on the counter drive side thereof, each extend from the rotation shaft to an outer peripheral surface side of the heat radiator, and are open to an outer peripheral surface of the heat radiator.

8. The totally-enclosed fan-cooled motor according to claim 1, wherein
the heat radiator includes a plurality of U-shaped cutout portions, which are formed in a surface on the drive side thereof, each extend from the rotation shaft to an outer peripheral surface side of the heat radiator, and are open to an outer peripheral surface of the heat radiator, and
a through hole, which penetrates from a surface on the drive side to a surface on the counter drive side, is formed in the cutout portions.

9. The totally-enclosed fan-cooled motor according to claim 8, wherein the through hole is formed at a position closer to the rotation shaft.

10. The totally-enclosed fan-cooled motor according to claim 1, wherein the heat radiator forms part of the ventilation path.

* * * * *